(12) United States Patent
Paulson

(10) Patent No.: US 6,951,354 B1
(45) Date of Patent: Oct. 4, 2005

(54) ELBOW FITTING FOR PNEUMATIC TRANSPORT SYSTEM

(75) Inventor: Jerome I. Paulson, Millersville, PA (US)

(73) Assignee: Pelletron Corporation, Lancaster, PA (US)

( * ) Notice: Subject to any disclaimer, the term of this patent is extended or adjusted under 35 U.S.C. 154(b) by 0 days.

(21) Appl. No.: 10/743,117

(22) Filed: Dec. 22, 2003

(51) Int. Cl.[7] .............................................. F16L 43/00
(52) U.S. Cl. ...................... 285/179; 406/193; 406/195
(58) Field of Search ........................ 285/179; 406/193, 406/196

(56) References Cited

U.S. PATENT DOCUMENTS

| | | | |
|---|---|---|---|
| 4,146,195 A * | 3/1979 | Brooks ........................ 406/190 |
| 4,387,914 A | 6/1983 | Paulson |
| 4,595,319 A | 6/1986 | Cook |
| 4,606,556 A * | 8/1986 | Metzger ....................... 285/16 |
| 4,641,864 A * | 2/1987 | Heine et al. ................. 285/179 |
| 4,733,889 A | 3/1988 | Haines |
| 4,767,243 A * | 8/1988 | Brannstroom ................ 406/193 |
| 4,865,353 A * | 9/1989 | Osborne ....................... 285/16 |
| 4,995,645 A | 2/1991 | Pausch |
| 5,024,466 A | 6/1991 | Brotz |
| 5,060,984 A * | 10/1991 | Hess ........................ 285/179.1 |
| 5,154,545 A * | 10/1992 | Morimoto et al. ........... 406/191 |
| 5,288,111 A | 2/1994 | Storf |
| 6,179,342 B1 * | 1/2001 | Shen ........................... 285/179 |
| 6,443,671 B1 * | 9/2002 | Weiste ......................... 406/195 |

FOREIGN PATENT DOCUMENTS

| | | | | |
|---|---|---|---|---|
| EP | 0 195 528 A1 * | 2/1986 | ........... F16L 43/00 |
| JP | 4-362394 | * 12/1992 | ........... F16L 43/00 |

* cited by examiner

*Primary Examiner*—James M. Hewitt
(74) *Attorney, Agent, or Firm*—Miller Law Group, PLLC

(57) ABSTRACT

An elbow fitting for use in a pneumatic product conveying system expands from the inlet pipe along the outer side of the elbow fitting and contracts along the outer side of the fitting toward the outlet pipe for guiding product particles into the outlet pipe. The expanded structure of the elbow fitting defines a generally triangularly shaped configuration that provides a wide surface over which an accumulated layer of product particles moves at a lower velocity than the velocity of the incoming product stream. The accumulation layer of product forms a moving contact surface for deflecting incoming product particles toward the outlet pipe with a minimum of pressure resistance and product attrition. The configuration of the expanded elbow fitting provides a slowly moving layer of accumulated product particles due to the law of gravity and Bernoulli's Law.

19 Claims, 4 Drawing Sheets

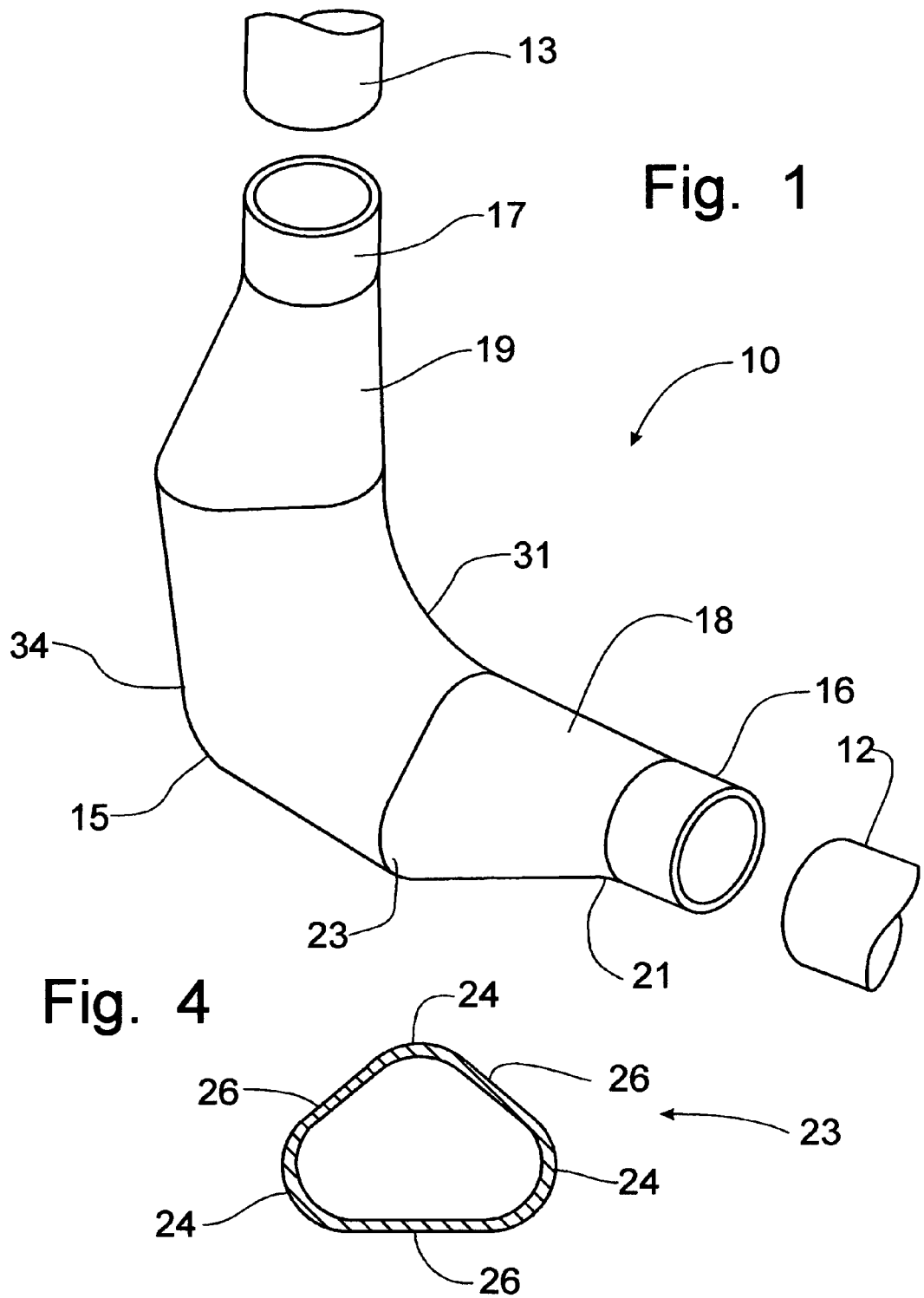

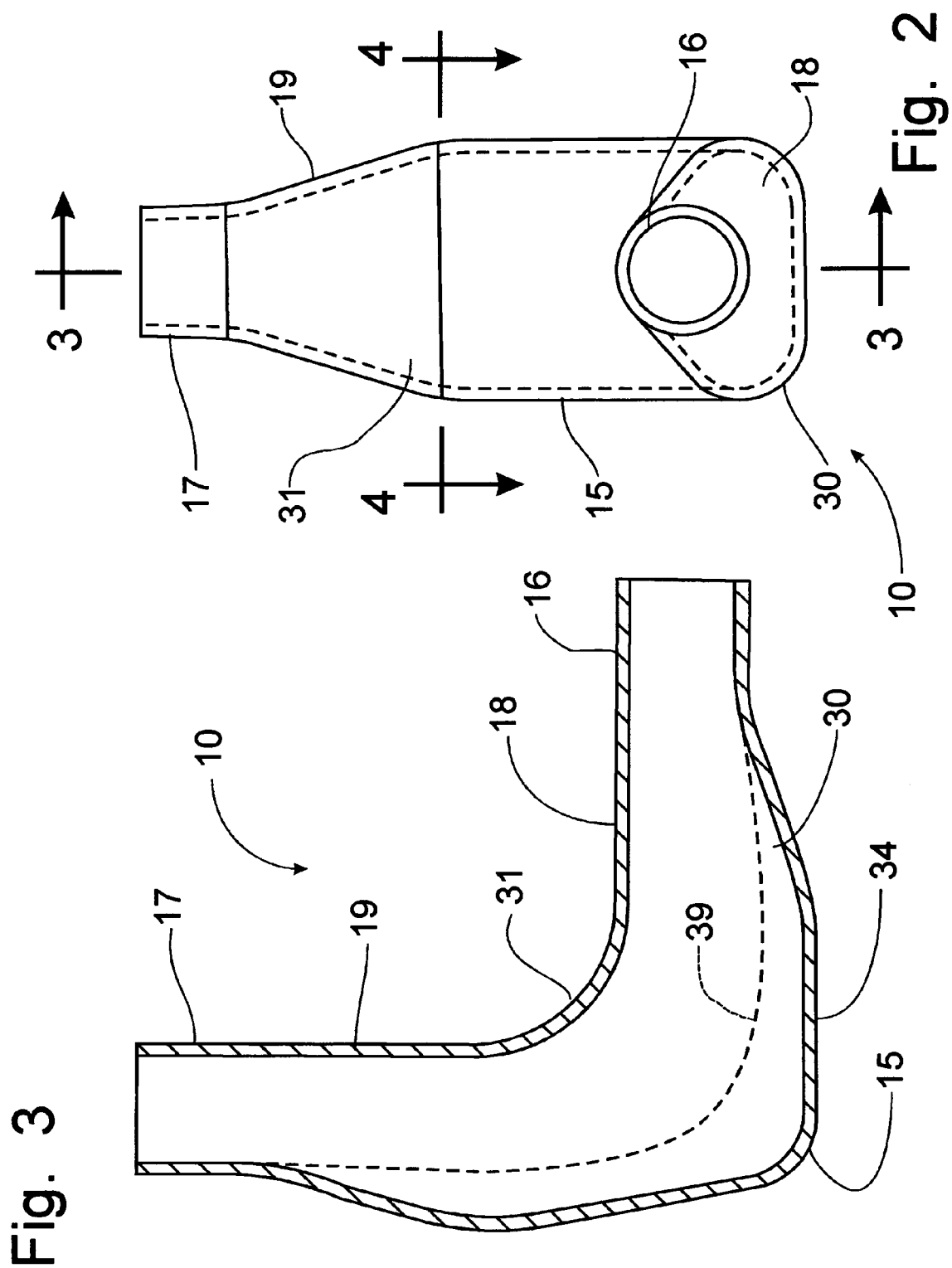

Fig. 5
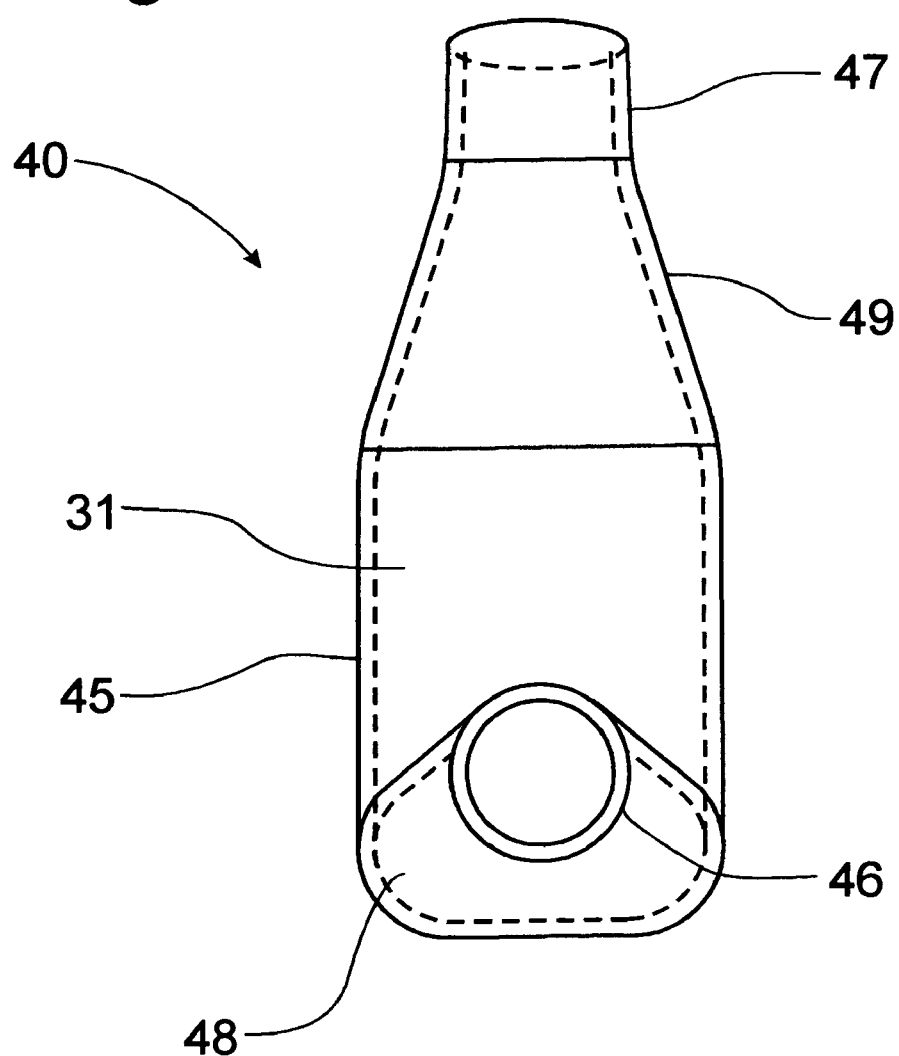
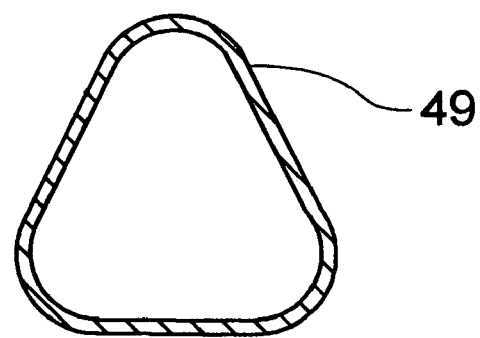
Fig. 8

ELBOW FITTING FOR PNEUMATIC TRANSPORT SYSTEM

BACKGROUND OF THE INVENTION

The present invention relates generally to pneumatic transport systems and, more particularly, to a fitting for pneumatic pipes to permit a change in direction of the material being conveyed therein.

Conveying solid particles injected into a high velocity stream of air contained within a pipe or tube is well known in industry. Dilute phase velocities often exceed sixty miles per hour and use up to one pound of air to move as much as five pounds of product per minute through the pipe. Typical air pressures for dilute phase systems will range from eight to twelve psig. High air velocity and low product particle population is accomplished with low pressure resistance, but greatly increased damage to the product particles being conveyed. Damage occurs in straight pipe sections, but is greatly increased whenever directional changes are imposed on the conveying system.

Dense phase systems move more product per pound of air, but travel at lower velocities and at higher pressures. Typically, system operating pressures will not exceed forty-five psig. Whether the conveying system is operating under dilute phase or dense phase, the product particles suffer considerable damage during transport, particularly when changes in direction are being used. To effect changes in direction elbow fittings having a radius as much as ten times the diameter of the pipe are used. Nevertheless, the combination of high velocity and centrifugal force does most of the damage, particularly on heat sensitive plastic compounds.

Elbow fittings used in pneumatic conveying systems typically suffer wear at the elbow curve in line with the product flow into the elbow fitting, whether the elbow fitting is a short radius elbow or a long radius sweep elbow fitting. Particles flowing into the elbow fitting impact the curved surface of the elbow and are redirected. The bouncing product particles create an area of turbulence that slows the speed of conveyance of the particles through the system, often causing plugging. Furthermore, the bouncing particles and the movement of the product particles around the outer surface of the elbow fitting generates friction, making the surface of the fitting warm to the touch. This heat can have a detrimental effect on the product being conveyed, particularly when the product is heat sensitive, such as plastic pellets on which the edges of the pellets will melt and adhere to the pipe.

One known attempt to overcome the problem of changing direction in a pneumatic conveying system is found in U.S. Pat. No. 4,387,914, issued to Hammertek Corporation on Jun. 14, 1983. In this Hammertek patent, the elbow fitting is formed with a vortex opening in substantial alignment with the incoming product stream from the straight section of pipe. The vortex section emulates a blocked "T" fitting by providing a chamber in which a loose ball of product particles slowly rotates to deflect incoming product without causing excessive wear on the fitting.

Another known attempt to overcome the aforementioned problems of changing directions in a pneumatic conveying system is taught in U.S. Pat. No. 5,288,111, issued to Waeschle Maschinenfabrik GmbvH on Feb. 22, 1994. IN the Waeschle patent, an angularly disposed baffle plate is positioned within an expanded elbow section that has a greater cross-sectional area than the cross-section of the pipe carrying the incoming product. The expanded elbow cross-section increases in size from the inlet pipe by expanding inwardly toward the inner elbow side. The outer elbow side of the expanding section defines a linear relationship with the inlet pipe to direct the stream of product particles into engagement with the baffle plate that is oriented at between 55 and 65 degrees with respect to the axis of the inlet pipe. Accordingly, the expanded elbow cross-section is not intended to provide a flow of material along the outer side of the elbow fitting. Excessive wear on the baffle plate is, therefore, incurred due to the direct impact with the incoming product stream.

Other deflector plate elbow fittings for pneumatic conveying systems are taught in U.S. Pat. No. 4,595,319, issued to Richard H. Cook for Cubeco, Inc. on Jun. 17, 1986; and in U.S. Pat. No. 4,733,889, issued to Edwin L. Haines for The Goodyear Tire and Rubber Company on Mar. 29, 1988. Both patents provide for an expanded elbow cross-section in conjunction with the obliquely arranged deflector plate or corresponding linear deflecting portion of the elbow outer side. In U.S. Pat. No. 4,606,556, issued to Robert E. Metzger for Fuller Company on Aug. 19, 1986, a stepped deflector plate is positioned at the outer elbow side to provide for a reduced wear elbow fitting. As the steps or ribs wear, the extra thickness of the material will permit a longer life for the fitting. In U.S. Pat. No. 4,995,645, issued to Josef Pausch for General Resource Corporation on Feb. 26, 1991, an open expanded area at the impact zone for the incoming particles is provided to create an accumulation of product in alignment with the incoming stream of product particles. The elbow section is expanded with a flare at 15 degrees to provide improved product flow after impacting the accumulated material.

In U.S. Pat. No. 5,024,466, issued to Gregory R. Brotz on Jun. 18, 1991, the elbow fitting is formed with an expanded box section at the outer elbow side in which a screen is positioned to engage product particles. The expanded box section is coupled to a vacuum system to hold particles against the screen member to form an accumulation area of product into which the incoming product particles impact. The captured product particles are retained against the screen until worn sufficiently to be replaced by other product particles. While the structure of the Brotz patent provides a layer of product to absorb the impact of incoming product particles and thus reduce wear on the outer side of the elbow, the Brotz apparatus does not contemplate a moving flow of material along the outer elbow side.

Accordingly, it would be desirable to provide an elbow fitting for use in pneumatic conveying or transport systems to improve wear characteristics on the outer elbow side of the fitting and to improve the flow characteristics for product moving through the fitting.

SUMMARY OF THE INVENTION

It is an object of this invention to overcome the aforementioned disadvantages of the known prior art by providing an elbow fitting for use in pneumatic conveying systems.

It is another object of this invention to provide a fitting for making directional changes in the flow path of a pneumatic product conveying system.

It is a feature of this invention that the elbow fitting expands along the outer side of the fitting to provide an accumulation layer of product particles.

It is an advantage of this invention that the incoming product particles impact into a slower moving accumulation layer along an inner surface of the outer side of the elbow fitting.

It is still another object of this invention to provide an elbow fitting for use in a dense phase pneumatic conveying system without utilizing a deflector plate for engaging the incoming stream of product particles.

It is yet another object of this invention to provide an elbow fitting that will experience a minimum of wear from engagement with an incoming stream of product particles in a pneumatic conveying system.

It is another advantage of this invention that the impact of incoming product particles is absorbed without causing substantial wear on a structural component of the elbow fitting.

It is another feature of this invention that the accumulation layer of product particles moves along an inner surface of the outer side of the elbow fitting at a slower velocity than the velocity of the incoming particle stream.

It is still another feature of this invention that the moving accumulation layer of product on an inner surface of the outer side of the elbow fitting continually provides a fresh impact zone for incoming product particles.

It is yet another advantage of this invention that product particles in the moving accumulation layer of product is not subjected to excessive wear from impact by incoming particles because of the movement of the accumulation layer, thus minimizing the creation of impact dust in the product stream.

It is yet another feature of this invention that the elbow structure expands along the outer side of the elbow fitting from the inlet pipe and contracts along the outer side of the elbow fitting to the outlet pipe.

It is still another feature of this invention that locating the expansion and contraction of the elbow fitting along the outer side of the fitting provides for the creation of an accumulation layer while permitting the accumulation layer to re-enter the product stream at the outlet pipe.

It is still a further advantage of this invention that the expanded structure of the elbow fitting establishes a slowly moving accumulation layer of product along an inner surface of the outer side of the elbow fitting.

It is still another advantage of this invention that the slowly moving accumulation layer of product minimizes wear on an inner surface of the outer side of the elbow fitting.

It is yet another feature of this invention that the shape of the elbow fitting provides an ideal aerodynamic shape for the flow of air and product through the fitting.

It is yet another advantage of this invention that heat generated from friction along an inner surface of the outer side of the elbow fitting is minimal and eliminates the melting of plastic particles from engagement with the elbow fitting.

It is a further advantage of this invention that the moving accumulation layer of product is uniformly distributed over an expanded triangular fitting configuration to provide a resultant reflective force upwardly toward the outlet pipe at approximately 90 degrees.

It is yet a further feature of this invention that the expanded portion of the elbow fitting forms a triangular shape.

It is still a further advantage of this invention that the elbow fitting provides a directional change for a pneumatic product conveying system with minimum pressure resistance and product attrition.

It is still another advantage of this invention that the reduction in resistance results in lower energy requirement for imposing a change in direction for the flow of product through a pneumatic transport system.

It is still another feature of this invention that the expanded shape for the outer side of the elbow fitting utilizes gravity and Bernoulli's Law to reduce the velocity of the accumulated product layer.

It is yet a further feature of this invention to provide an elbow fitting configuration that can be utilized to create either a 90 degree directional change or a 45 degree direction change for the product stream.

It is yet another object of this invention to provide an elbow fitting for pneumatic product conveying systems that is durable in construction, inexpensive of manufacture, carefree of maintenance, facile in assemblage, and simple and effective in use.

These and other objects, features and advantages are accomplished according to the instant invention by providing an elbow fitting for use in a pneumatic product conveying system in which the fitting expands from the inlet pipe along the outer side of the elbow fitting and contracts along the outer side of the fitting toward the outlet pipe for guiding product particles into the outlet pipe. The expanded structure of the elbow fitting defines a generally triangularly-shaped configuration that provides a wide surface over which an accumulated layer of product particles moves at a lower velocity than the velocity of the incoming product stream. The accumulation layer of product forms a moving contact surface for deflecting incoming product particles toward the outlet pipe with a minimum of pressure resistance and product attrition. The configuration of the expanded elbow fitting provides a slowly moving layer of accumulated product particles due to the law of gravity and Bernoulli's Law.

BRIEF DESCRIPTION OF THE DRAWINGS

The advantages of this invention will be apparent upon consideration of the following detailed disclosure of the invention, especially when taken in conjunction with the accompanying drawings wherein:

FIG. 1 is a perspective view of a 90 degree elbow fitting incorporating the principles of the instant invention;

FIG. 2 is an elevational view of the elbow fitting depicted in FIG. 1;

FIG. 3 is a cross-sectional view of the elbow fitting depicted in FIG. 1 taken along the centerline axis of the fitting, corresponding to lines 3—3 of FIG. 2;

FIG. 4 is a cross-sectional view of the elbow fitting taken along lines 4—4 of FIG. 3;

FIG. 5 is an elevational view of a 45 degree elbow fitting incorporating the principles of the instant invention;

FIG. 8 is a cross-sectional view of the elbow fitting taken at the intersection of the curved expanded portion and the outlet transition portion, corresponding to lines 8—8 of FIG. 7.

DETAILED DESCRIPTION OF THE PREFERRED EMBODIMENT

Figure 7:
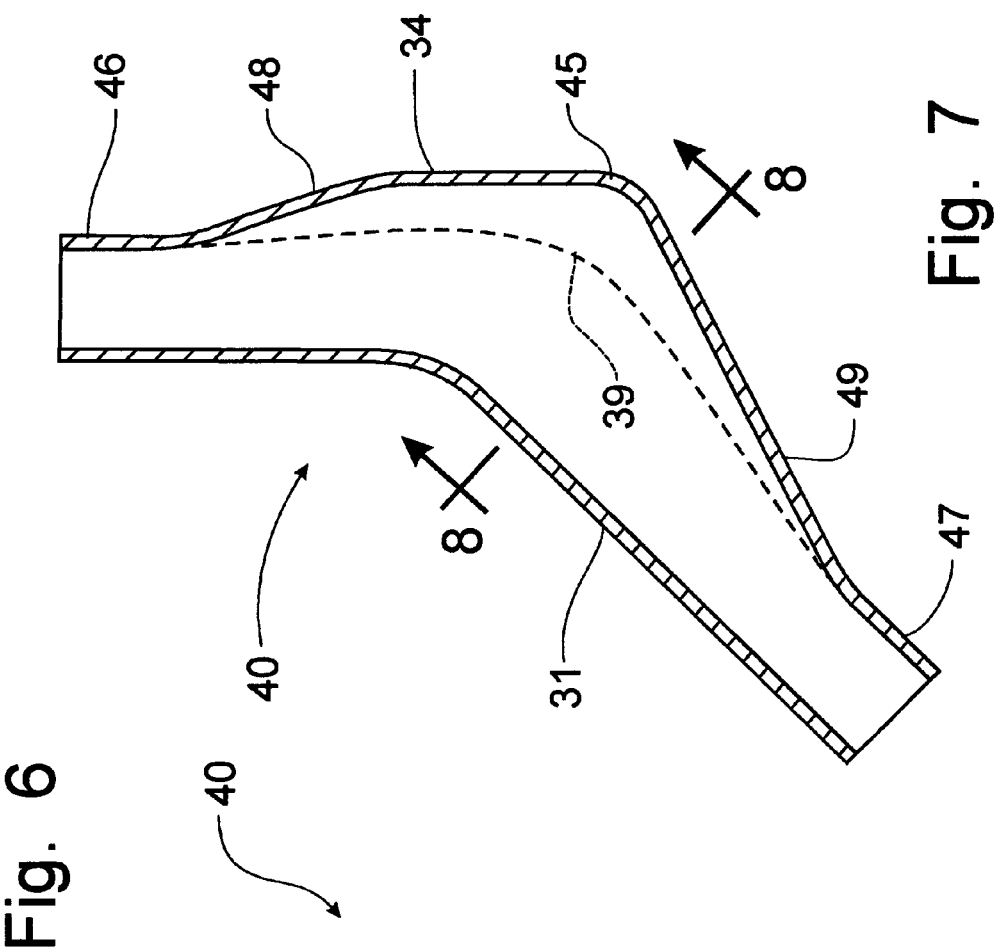
FIG. 7 is a cross-sectional view of the elbow fitting taken along the centerline axis of the fitting, corresponding to lines 7—7 of FIG. 6.

Referring now to FIGS. 1–4, a 90 degree elbow fitting for use in a pneumatic product conveying system, and incorporating the principles of the instant invention, can best be seen. The elbow fitting 10 is to be connected to a conventional inlet pipe 12 and an outlet pipe 13 to provide a directional change for the path of travel of the product within the pipes 12, 13. While the instant invention is intended for use with dense phase pneumatic systems, an elbow fitting 10 incorporating the principles of the instant invention can also be utilized with dilute phase pneumatic systems. Typically, dense phase pneumatic systems fill the pipe with product particles and inject a sufficient amount of air to effect movement of the product through the pipe 12, 13. Accordingly, a substantial amount of product particles are being moved at a significant velocity through the pipes 12, 13. Changing directions typically results in wear from the product particles rubbing against the inside of the fitting, which also creates heat from friction that can melt plastic particles being conveyed through the pneumatic system.

The elbow fitting 10 is preferably formed from a durable metallic material, such as steel or stainless steel, and includes an inlet portion 16 and an outlet portion 17, each of which are sized to mate with the inlet pipe 12 and the outlet pipe 13 in a known manner, such as through a compression coupling (not shown). Between the inlet portion 16 and the outlet portion 17, the elbow fitting 10 includes an inlet transition section 18 and an identical outlet transition section 19 connected, respectively, to the inlet portion 16 and the outlet portion 17. Lastly, a curved expanded section 15 interconnects the inlet and outlet transition sections 18, 19.

The inlet and outlet transition sections 18, 19 transcend between a circular portion 21 and a generally triangular portion 23. The circular portion 21 is connected to the corresponding inlet or outlet portion 16, 17, while the triangular portions 23 are connected to opposing ends of the curved expanded portion 15. The triangular shape of the triangular portion 23 generally carries through the curved expanded portion 15, except as required to curve from one direction to another at the apex of the curved expanded portion 15. Preferably, the triangular shape of the triangular portion 23, as is best seen in FIG. 4, has three curved apexes 24, all of which are formed at approximately the same radius of curvature as the inlet and outlet portions 16, 17. Each apex 24 is connected with the adjacent apex 24 by a linear portion 26 that defines a bottom portion 27 of the triangular portion 23 that has a width approximately equal to twice the diameter of the inlet and outlet portions 16, 17.

Figure 6:
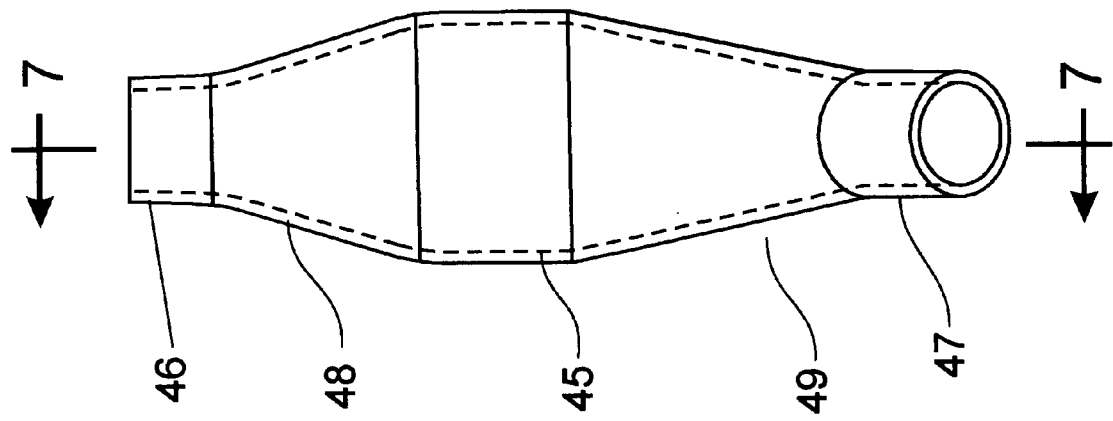
FIG. 6 is a top plan view of the elbow fitting depicted in FIG. 5.

Looking at the cross-sectional view through the centerline axis of the elbow fitting 10, as depicted in FIG. 3, it can be seen that the inner side 31 of the elbow fitting 10 continues linearly from the inlet pipe 12 through a curved area 34 to another linear run to the outlet pipe 13. The outer side 34 of the elbow fitting 10 provides an expanded cross-section area for the elbow fitting 10 by extending downwardly through the inlet transition portion 18 from the inlet portion 16 to the curved expanded portion 15. As can be seen in FIGS. 5 and 6, which will be described in greater detail below, the cross-section area of the triangular portion 23 is approximately three times the size of the cross-sectional area of the circular portion 21. One skilled in the art will also recognize that approximately two-thirds of this cross-sectional area can be defined as an expanded area 30 positioned outside (i.e. toward the outer side of the elbow fitting) the extension of the circular inlet portion 21.

The law of gravity and centrifugal force will urge product particles outwardly into this expanded area 30 to provide an slurry of accumulated particles along an inner surface of the outer side 34 of the curved expanded portion 15 of the elbow fitting 10. Due to the expanded cross-sectional area of the curved expanded portion 15, Bernoulli's Law requires that the velocity of the product particles will be slowed, as compared to the velocity of the product particles traveling through the circular inlet portion 16. This layer of accumulated particles, represented by dashed line 39, provides a moving impact zone for the incoming particles exiting the inlet portion 16, which can then be deflected upwardly toward the outlet pipe 13 to effect a change of direction for the product being conveyed.

The slowly moving layer 39 of accumulated product particles along an inner surface of the outer side 34 of the curved expanded section 15 also prevent an elevation of the temperature of the fitting 10 that would be normally attributable to friction from the impact of the incoming particles against an inner surface of the outer side of the fitting 10. As a result, the particles will not be damaged by the elevation in temperature.

The curved expanded section 15 is preferably formed with a curved outer side 34, or for the sake of manufacturing convenience may be formed from a pair of linear portions 36, 37 interconnected by a curved portion 39. The linear portions 36, 37 are not perpendicular but are disposed through an angular deflection of approximately 100 degrees, which is at approximately 80 degrees to the line of the incoming product stream through the inlet pipe 12. Since the layer 39 of accumulated product particles along an inner surface of the outer side 34 serves to deflect incoming particles toward the outlet pipe 13, the outer side 34 does not need to function as a deflector plate that needs to be disposed at 55 to 65 degrees with respect to the axis of the inlet pipe 12.

The outlet transition section 19 provides a smooth transition from the shape of the triangular portion 23 of the curved expanded section 15 to the circular shape of the outlet portion 17. Thus, the layer 39 of accumulated product particles is directed back into the outlet pipe 13 to provide a continuous flow of particles through the elbow fitting, including the moving accumulated layer 39 along the outer side 34 of the fitting.

From a dimensional viewpoint, the instant invention provides for a compact elbow fitting for use in pneumatic product conveying systems that is heretofore unknown in the art. In the way of example, for an inlet pipe 12 having a nominal diameter of 2.25 inches, the inlet and outlet portions 16, 17 can have an axially extending length dimension of 1.44 inches with the inlet and outlet transition portions 18, 19 having an axially extending length dimension of about 4.19 inches. The curved expanded portion 15 can then include a circular bend on the inner side 31 that has a radius of 2.50 inches. The depth of the fitting 10 will vary from 2.25 inches at the inlet and outlet portions 16, 17 to about 3.38 inches at the triangular portion 23 at the end of the transition portions 18, 19. The overall width of the outer side at the triangular portion 23 would preferably be about twice the diameter of the inlet pipe, or about 4.50 inches. Thus, the elbow fitting 10 presents a compact configuration for making a directional change in a pneumatic system.

As can be seen in FIGS. 5–8, this configuration for an elbow fitting can also be utilized for a 45 degree elbow fitting 40, which effects a 45 degree change in direction for the flow path of the product being conveyed from the inlet pipe 12 to the outlet pipe 13 instead of the 90 degree directional change effected in the embodiment of the invention depicted in FIGS. 1–4. The structure of the elbow fitting 40 is substantially identical to that described above with respect to the 90 degree elbow fitting 10 with an inlet portion 46, and outlet portion 47, an inlet transition portion 48, an outlet transition portion 49, and a curved expanded portion 45. The "bend" defined by the curved expanded portion 45, however, effects an angular change of only 45 degrees.

The expanding cross-section through the inlet transition portion 48 permits the formation of an accumulation layer 39 of product particles that move slowly toward the outlet portion 47 to provide a continuously moving impact zone for deflecting particles within the incoming product stream moving into the fitting 40 through the inlet pipe 12. The outlet transition portion 49 may be linear in nature, reducing from the expanded triangular shape depicted in FIG. 8 to the circular cross-section configuration of the outlet portion 47. As with the 90 degree elbow 10 described above, the function of the inlet transition portion 46 is to provide an expanded section that has a widened outer side 34 and expands outwardly to provide a layer of accumulated product particles 39 along an inner surface of the outer side 34 of the fitting 40 to deflect incoming product particles from the inlet portion 46 toward the outlet portion 47, the outlet transition portion 49 being operative to guide the slowly moving layer 39 into the outlet portion 47.

From a dimensional standpoint, the instant invention provides for a compact 45 degree elbow fitting for use in pneumatic product conveying systems that is heretofore unknown in the art. In the way of example, for an inlet pipe 12 having a nominal diameter of 2.25 inches, the inlet and outlet portions 16, 17 can have an axially extending length dimension of about 2.25 inches with the inlet and outlet transition portions 18, 19 having an axially extending length dimension of about 3.38 inches. The curved expanded portion 15 can then include a circular bend on the inner side 31 that has a radius of 3.63 inches. The depth of the fitting 10 will vary from 2.25 inches at the inlet and outlet portions 16, 17 to about 3.38 inches at the triangular portion 23 at the end of the transition portions 18, 19. The overall width of the outer side at the triangular portion 23 would preferably be about twice the diameter of the inlet pipe, or about 4.50 inches.

While the elbow fittings 10, 40 are described above as being particularly suitable for use in either dense phase or dilute phase pneumatic product transport systems, one skilled in the art will recognize that the same principles for effecting a directional change for slurry product transport systems also apply. The elbow fitting 10, 40 described above provides a lower resistance to effecting directional changes in the flow of product particles through the system. As a result, the energy required to effect directional changes is lower than known long radius elbows. Damage to the product being conveyed due to frictional losses and impact, as is known for long radius elbow fittings, will be significantly reduced. Accordingly, superior results with lower energy costs are associated with the instant invention.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

What is claimed is:

1. An elbow fitting for use in effecting directional changes from an inlet pipe to an outlet pipe in a pneumatic product conveying system, comprising:

a circular inlet portion connectable to said inlet pipe to receive a flow of product particles therefrom;

an inlet transition portion connected to said inlet portion and expanding from a generally circular cross-section to an expanded non-circular cross-section having an outer side width dimension that is greater than a diameter dimension of said inlet portion, said inlet transition portion expanding in depth into a radially outward side of said elbow fitting, a radially inward side of said elbow fitting maintaining a linear relationship with respect to said inlet portion and said inlet pipe;

a curved expanded portion connected to said inlet transition portion and carrying said width dimension through an angular deflection;

an outlet transitional portion connected to said curved expanded portion to reduce the cross-sectional area from said expanded non-circular cross-section to said generally circular cross-section, wherein said non-circular cross-sectional area is generally triangular; and an outlet portion having said circular cross-section and being connected to said outlet transitional portion, said outlet portion also being connectable to said outlet pipe to convey said flow of product particles into said outlet pipe.

2. The elbow fitting of claim 1 wherein said expanded radially outward side of said elbow fitting causing a reduction of velocity of said flow of product particles from said inlet pipe to create a layer of accumulated product particles along an inner surface of said radially outward side of said fitting.

3. The elbow fitting of claim 1 wherein said triangular cross-section is oriented with an apex at said radially inward side of said elbow fitting and a base oriented at said radially outward side of said elbow fitting.

4. The elbow fitting of claim 3 wherein said outlet transitional portion directs said layer of accumulated product particles inwards said outlet pipe so that said layer of accumulated product particles provides a moving impact zone for incoming higher velocity product particles from said inlet pipe to effect a re-direction of said incoming higher velocity product particles toward said outlet pipe.

5. The elbow fitting of claim 4 wherein said elbow fitting effects a ninety degree directional change to said flow of product particles.

6. The elbow fitting of claim 4 wherein said elbow fitting effects a forty-five degree directional change to said flow of product particles.

7. A method of effecting a directional change in a flow path of product particles flowing in a dilute phase through a pneumatic product conveying system having an inlet pipe, an outlet pipe and an elbow fitting interconnecting said inlet and outlet pipes to provide structure for effecting said directional change, comprising the steps of:

providing said elbow fitting with an expansion in dimension toward an outer side of said elbow fitting, said expansion of dimension including an increase in depth measured from an inner side of said fitting and an increase in effective width with respect to said inner side;

establishing a layer of accumulated product particles along an inner surface of said outer side of said elbow fitting, said layer of accumulated product particles moving toward said outlet pipe at a velocity slower than a velocity of incoming product particles moving from said inlet pipe into said elbow fitting;

deflecting said incoming product particles off said layer of accumulated product particles to effect a change of direction of said incoming product particles toward said outlet pipe; and discharging said product particles through said outlet pipe in a dilute phase.

8. The method of claim 7 wherein said providing step includes providing an inlet transition portion of said elbow fitting to change a cross-sectional configuration of said elbow fitting from a generally circular cross-section at said inlet pipe to an expanded non-circular cross-section in said elbow fitting.

9. The method of claim 8 wherein said step of providing an inlet transition portion of said elbow fitting defines said non-circular cross-section as a generally triangular shape with an apex oriented at said inner side and a base at said outer side of said elbow fitting.

10. The method of claim 9 further comprising the step of:
    guiding said layer of accumulated product particles through said elbow fitting toward said outlet pipe so that said layer of accumulated product is constantly moving along said inner surface of said outer side of said elbow fitting.

11. The method of claim 10 wherein said deflecting step deflects said incoming product particles through an angular deflection of approximately ninety degrees.

12. The method of claim 10 wherein said deflecting step deflects said incoming product particles through an angular deflection of approximately forty-five degrees.

13. In an elbow fitting for effecting a change of direction of product flow through a pneumatic product conveying system having an inlet pipe and an outlet pipe, said elbow fitting interconnecting said inlet and outlet pipes, the improvement comprising:
    an inlet transition portion connected to an inlet portion and expanding from a generally circular cross-section to an expanded non-circular cross-section having an outer side width dimension that is greater than a diameter dimension of said inlet portion, said inlet transition portion expanding in depth into an outer side of said elbow fitting, an inner side of said elbow fitting maintaining a linear relationship with respect to said inlet portion and said inlet pipe;
    a curved expanded portion connected to said inlet transition portion and carrying said width dimension through an angular deflection; and
    an outlet transitional portion connected to said curved expanded portion to reduce the reduce the cross-sectional area from said expanded non-circular cross-section to said generally circular cross-section.

14. The elbow fitting of claim 13 wherein said elbow fitting further comprises:
    said inlet portion interconnecting said inlet pipe and said inlet transition portion to receive an incoming flow of product particles from said inlet pipe; and
    an outlet portion interconnecting said outlet pipe and said outlet transition portion to transfer said flow of product from said elbow fitting to said outlet pipe.

15. The elbow fitting of claim 14 wherein said inlet portion and said outlet portion have generally circular cross-sections, said inlet and outlet transition portions changing from a generally circular cross-section to an expanded non-circular cross-section, said curved expanded section continuing said non-circular cross-section from said inlet transition portion to said outlet transition portion.

16. The elbow fitting of claim 15 wherein said non-circular cross-section has a generally triangular shape with an apex at said inner side of said elbow fitting and a base at said outer side of said elbow fitting.

17. The elbow fitting of claim 16 wherein said expanded outer side of said elbow fitting causing a reduction of velocity of said flow of product particles from said inlet pipe to create a layer of accumulated product particles along an inner surface of said outer side of said fitting.

18. The elbow fitting of claim 17 wherein said outlet transition portion directs said layer of accumulated product particles into said outlet pipe so that said layer of accumulated product particles provides a moving impact zone for incoming higher velocity product particles from said inlet pipe to effect a re-direction of said incoming higher velocity product particles toward said outlet pipe.

19. The elbow fitting of claim 18 wherein elbow fitting effects a ninety degree directional change to said flow of product particles.

* * * * *